July 18, 1961  A. R. CUNNINGHAM  2,992,522
FODDER TREATING MACHINE
Filed Dec. 8, 1958  2 Sheets-Sheet 1
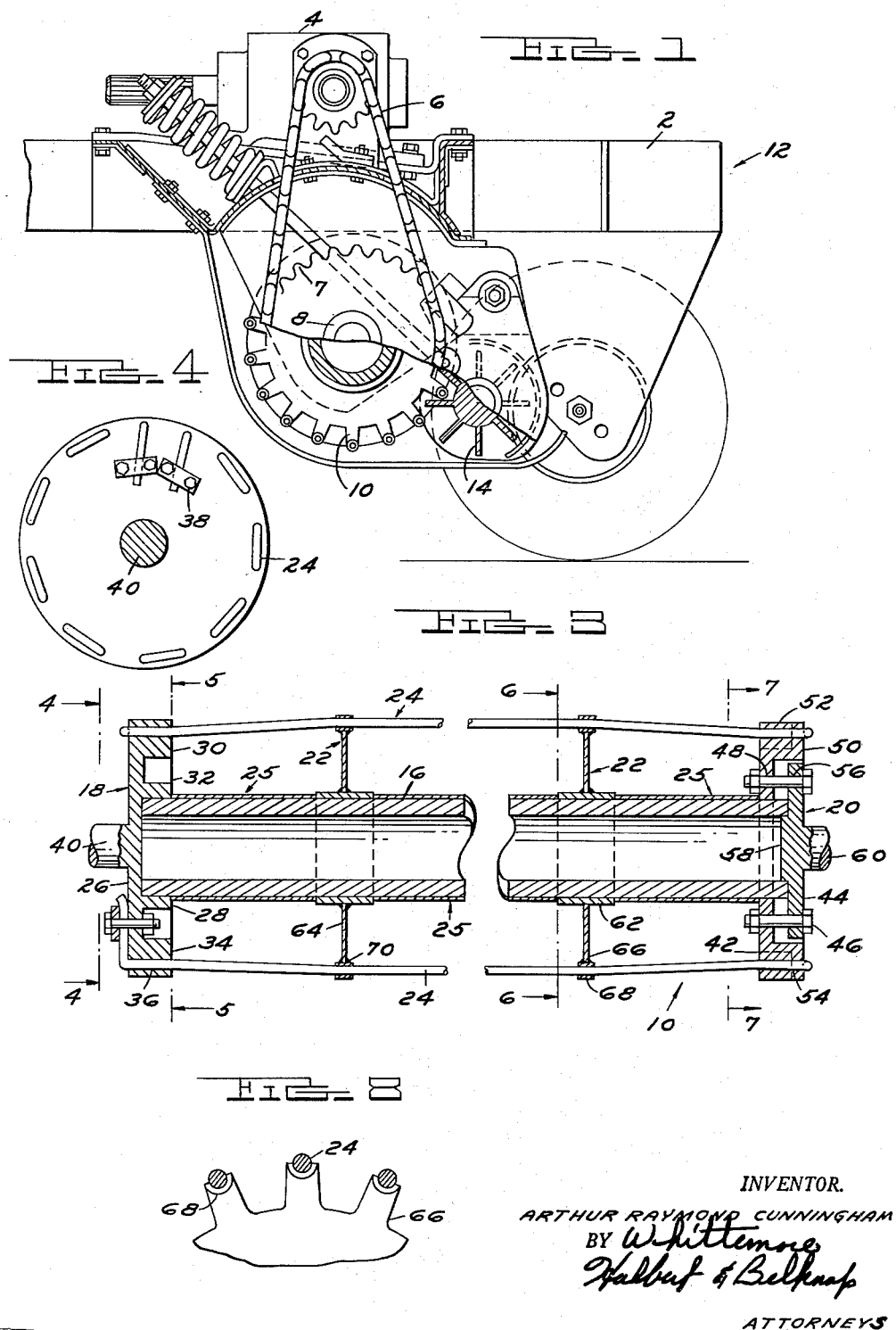
INVENTOR.
ARTHUR RAYMOND CUNNINGHAM
BY
ATTORNEYS July 18, 1961  A. R. CUNNINGHAM  2,992,522
FODDER TREATING MACHINE
Filed Dec. 8, 1958  2 Sheets-Sheet 2
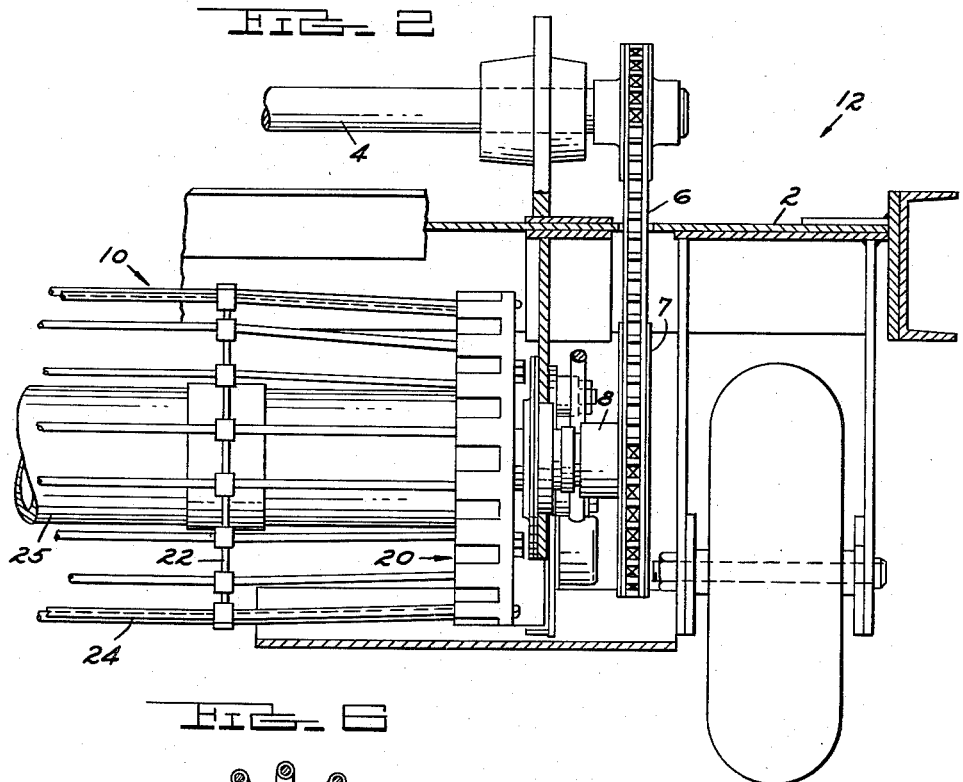
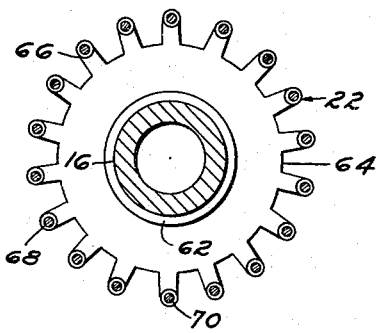
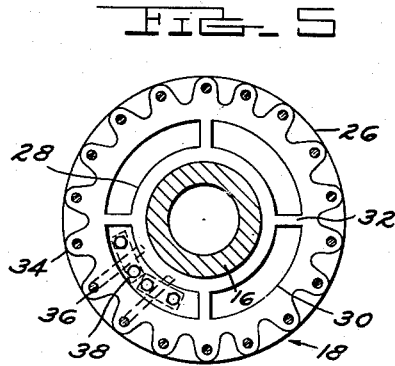
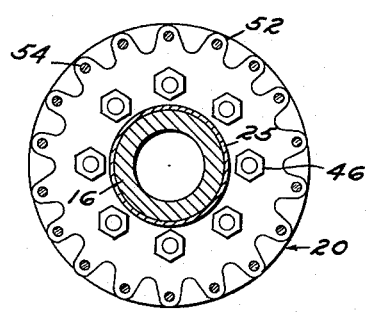
INVENTOR.
ARTHUR RAYMOND CUNNINGHAM
BY
ATTORNEYS

United States Patent Office 2,992,522
Patented July 18, 1961

2,992,522
FODDER TREATING MACHINE
Arthur Raymond Cunningham, Chicago, Ill., assignor to Cunningham & Sons, Chicago, Ill., a partnership
Filed Dec. 8, 1958, Ser. No. 778,841
12 Claims. (Cl. 56—1)

This invention relates to improvements in a crop treating device and refers more particularly to a roll therefor having flexible longitudinal members mounted on rotatable supports.

In the past crop-treating rolls have been rigid in construction. They have been formed of stationary staves or rods supported by fixed spiders rigidly mounted on a rotatable shaft. Because of their rigidity such crop treating rolls are subject to considerable damage due to rocks and sticks which are commonly picked up in open fields by the crop treating device along with the crops to be treated. Rocks, sticks and other rigid articles when caught between crop treating rolls cause the stationary staves or rods to break or become permanently deformed thereby necessitating repairs which are costly in both time and labor. Such repairs often require the complete removal of the crop treating roll from the crop treating machine.

It is therefore one of the essential features of this invention to provide a crop treating roll for crop treating devices which will not break or permanently deform when sticks or rocks cause the jamming of the roll in normal operation.

Another object is to provide a crop treating roll for use with a crop treating device which roll includes rotatably mounted spacers.

Another object is to provide a crop treating roll for use with a crop treating machine which has a central shaft rotatable independently of the roll support members.

Another object is to provide a crop treating roll wherein the longitudinal members engaging the crop to be treated are flexible.

Another object is to provide a crop treating roll wherein the longitudinal members engaging the crop are formed of a single flexible cable.

Another object is to provide a crop treating roll constructed so that the longitudinal members engaging the crop may be easily removed and replaced.

Another object is to provide a crop treating roll for use with a crop treating device which is simple in construction, easy to manufacture and efficient in use.

The foregoing and other important objects and desirable features inherent in and encompassed by the invention will become apparent as a preferred embodiment of the invention is fully disclosed in the following description and accompanying drawings in which:

FIGURE 1 is a partially broken away longitudinal section of a crop treating device having a crop treating roll according to the invention mounted thereon.

FIGURE 2 is a partial cross-section view of the drop treating device of FIGURE 1 illustrating the mounting of the crop treating roll of the invention on a crop treating device.

FIGURE 3 is a broken longitudinal section view of a crop treating device according to the invention.

FIGURE 4 is a cross-section view of the crop treating roll of FIGURE 3 taken on line 4—4 in FIGURE 3.

FIGURE 5 is a cross-section of the crop treating roll along line 5—5 in FIGURE 3 showing the left end cable holder.

FIGURE 6 is a cross-section of the crop treating roll along line 6—6 in FIGURE 3 showing a cable spacing disk.

FIGURE 7 is a cross-sectional view of the crop treating roll along line 7—7 in FIGURE 3 showing the right end cable holder.

FIGURE 8 is a partial cross-section of a crop treating roll according to the invention showing a modification of the cable spacing disk.

In the embodiment of the invention illustrated in the figures a crop treating roll 10 according to the invention is shown mounted on a rotary crop treating device 12 such as that disclosed in United States Patent Number 2,711,622 and illustrated in FIGURES 1 and 2. In crop treating device 12 the frame is indicated at 2, the drive mechanism is shown at 4 mounted on frame 2, drive chain 6 is shown engaging a sprocket and bearing mechanism 8 which are adapted to cause roll 10 to rotate. The frame 2, drive mechanism 4, drive chain 6 and the sprocket 7 and bearing mechanism 8 which are illustrated in the drawings are fully described in the patent referred to and therefore will not be referred to further herein. Applicant's invention resides in an improved crop treating roll 10 which may be mounted in crop treating device 12 as an alternative to the large or forward roll in the device disclosed in the patent referred to.

When the crop treating device 12 passes over a crop which has been cut and is laying on its stubble in a field, the crop is picked up and passed between rotating roll 10 and complementary rotating rigid roll 14 whereby the crop is crushed to expedite its drying as fully set forth in the specification of the patent referred to above.

Rocks and sticks may also be picked up by the crop treating device 12 and passed between roll 10 and roll 14 causing jamming thereof. According to the invention however roll 10 is constructed in such a manner that the jamming of rolls 10 and 14 due to undesirable matter picked up by crop treating device 12 will not damage the rolls. Furthermore many objects which woud jam rigid rolls pass between roll 14 and roll 10 without jamming them due to the flexible construction of roll 10.

Roll 10 is a flexible crop treating roll comprising an axial tube or hollow shaft 16 having a cable holder 18 and 20 loosely mounted on opposite ends, rotatable spacer disks 22 inserted on the tube 16 between the cable holders and a flexible cable 24 passing between the cable holders in a plurality of strands thereby holding the tube, cable holders and spacer disks in assembly.

Axial tube 16 as best illustrated in FIGURES 2 and 3 is an elongated cylindrical member having square cut ends against which cable holders 18 and 20 are butted. Spacer disks 22 are inserted on axial tube 16 as indicated between cable holders 18 and 20. Short sections of tubing 25 having an inside diameter only slightly greater than the outside diameter of tube 16 are inserted on tube 16 between the cable holders 18 and 20 and the spacer disks 22 and also between adjacent spacer disks 22 to insure proper spacing of spacer disks 22 along tube 16. It will be noted that no rigid connections are made to axial tube 16.

Cable holder 18 which is abutted against one end of axial tube 16 in roll 10 is best shown in FIGURES 3 and 5. Cable holder 18 includes a circular disk 26 having two concentric annular flanges 28 and 30 rigidly secured to one side thereof and separated by web members 32. Tube 16 fits within the inner concentric flange 28 and is rotatable with respect thereto. The outer concentric flange is provided with a plurality of spaced radially extending bosses 34 as indicated in FIGURE 5. Openings 36 axial to roll 10 are provided extending through the bosses 34 and the circular disk 26 as illustrated. Flexible cable 24 is passed through openings 36 as later described. Openings 38 are provided in circular disks 26 between concentric annular flanges 28 and 30 through which U-bolts may be passed to secure the ends of flexible cable 24 to cable holder 18. A short cylindrical axle stub 40 is permanently secured to the center of the other side of circular disk 26. The axle stub 40 is provided to mount the roll 10 in crop treating device 12 as indicated in FIGURE 2.

Cable holder 20 which is butted against the other end of axial tube 16 in roll 10 includes two complementary members 42 and 44 held in assembly by bolts 46 and is best shown in FIGURES 3 and 7. Member 42 is an annular disk adapted to be inserted over tube 16 as shown. Openings 48 are provided spaced around the inner edge of member 42 through which bolts 46 may be passed. An annular flange 50 having radial bosses 52 extending therefrom as illustrated is provided on one side of annular disk 42. Openings 54 through which flexible cable 24 may be passed are provided through bosses 52 and disk 42 axial to roll 10. Member 44 is a circular disk having openings 56 in the periphery thereof in alignment with openings 48 in member 42. A concentric circular disk 58 is mounted on one side of disk 44 and serves to position cable holder 20 on tube 16. A short axle stub 60 similar to axle stub 40 is secured to the center of the other side of disk 44. Like stub 40, stub 60 is provided to mount the roll 10 in crop treating device 12. With cable holder 20 assembled as shown bolts 46 serve to tighten cable 24 as later described.

Spacer disks 22 as illustrated in FIGURE 6 are provided along axial tube 16 at predetermined intervals and are held rotatably in position by members 25 as previously indicated. Disks 22 include a short cylindrical member 62 adapted to be inserted over tube 16, a radially extending flange 64 centrally located along the length of member 62 and spaced apart radially projecting portions 66 of flange 64 having bosses 68 attached to the ends thereof with openings 70 therethrough axial to roll 10. Spacer disks 22 are provided to correctly space the strands of flexible cable 24 passing between cable holders 18 and 20 so that proper meshing with roll 14 on crop treating device 12 will be assured.

Flexible cable 24 as best illustrated in FIGURE 2 is passed back and forth between cable holders 18 and 20 a plurality of times. As indicated in FIGURE 4 cable 24 passes through one opening and back through an adjacent opening 36 or 54 in cable holders 18 or 20 respectively on reaching either end of roll 10. In between cable holders 18 and 20 cable 24 passes through openings 70 in bosses 68 on spacer disks 22. Thus the cable 24 starting at cable holder 18 is threaded back and forth between cable holders 18 and 20 passing through spacer disks 22 and eventually ending at cable holder 18. The cable ends are then secured to cable holder 18 by means of U-bolts passed through openings 38 as shown in FIGURE 4.

The tube 16, cable holders 18 and 20, tube 25, and spacer disks 22 are held in assembly to form roll 10 as illustrated by cable 24 in the manner above described. The cable 24 may be tightened by means of bolts 46 on cable holder 20 whereby cable holders 18 and 20 are forced tightly against the ends of axial tube 16 and the individual strands of cable 24 between cable holders 18 and 20 are straightened to form a squirrel cage type of roll 10 having flexible longitudinal members mounted on rotatable supports.

Cable holders 18 and 20 have been described as merely being abutted against the ends of axial tube 16. They may thus be allowed to rotate freely on tube 16.

In FIGURE 8 a portion of a modified spacer disk 22 according to the invention is illustrated. In the modification bosses 68 are half cylinders rather than full cylinders as indicated in FIGURE 6. The modified form of spacer disk has the advantage of allowing flexible cable 24 to be more easily positioned on disk 22 and also allows removal of cable 24 from disks 22 should serious jamming occur between rolls 10 and 14.

In use rotary crop treating device 12 having flexible roll 10 according to the invention attached thereto is passed over a crop to be treated. Small stones and sticks which are picked up with the crop to be treated by rollers 14 and 10 are passed between the rollers due to the flexible nature of cable 24 forming the longitudinal members of roll 10 and the rotating mounting of spacing disks 22 and axial tube 16. Furthermore due to the flexible nature of roll 10 as set forth above no damage will be done to the rolls should they become jammed by large sticks or stones.

What I claim as my invention is:

1. A roll for use with a rotary crop treating device adapted to crush the crop, comprising a shaft having a cable holder loosely attached to both ends thereof and a plurality of disks rotatably mounted along the length thereof, rotatable tubular spacers inserted on said shaft between the cable holders and the disks and between the disks, said cable holders and disks having openings therethrough spaced around the periphery thereof, a flexible cable passing through said openings and extending in a plurality of strands between said cable holders through the openings in said disks thereby holding said cable holders, disks, spacers and shaft in assembly and means secured to the axially outer side of both said cable holders to rotatably mount said roll in said crop treating device.

2. In a rotary crop treating device adapted to advance over a field of previously harvested plant toppings and to crush the plant toppings, including a pair of crop treating rolls mounted on said crop treating device on horizontal parallel axes transverse to the line of advance of the crop treating device, which rolls have loosely meshing teeth; a roll adapted for use as one of said pair of crop treating rolls including means operable to reduce breakage and permanent deformation of roll teeth due to objects jamming the rolls of the crop treating device in operation thereof, comprising a shaft having a cable holder loosely attached to each end thereof and disks mounted along the length of the shaft, said cable holders having openings spaced around their periphery, the disks having cable guides spaced around the periphery, a flexible cable passing through said openings and extending in a plurality of strands over said cable guides between said cable holders thereby securing said cable holders, disks and tube in assembly, said cable being fastened at both ends to one of said cable holders, means on the other of said cable holders to tighten said cable thereby imparting rigidity to said roll and a short cylindrical axle stub attached to the cable holders at each end of the roll and extending outwardly and axially with respect to said roll.

3. A roll for use with a rotary crop treating device adapted to crush the crop, comprising a shaft having a cable holder loosely mounted on each end thereof, flexible cable extending between said cable holders in a plurality of strands securing said cable holders and shaft in assembly, means attached to the axially outer sides of said cable holders for rotatably mounting said roll in said crop treating device, one of said cable holders including a circular disk having a pair of concentric annular members attached to one face thereof, the outer concentric member having a plurality of circumferentially spaced openings therein extending through said circular disk, the inner concentric member being formed to fit over the end of said shaft, and openings in said circular disk between said concentric members to permit the securing to said disk of means to fasten said flexible cable to said cable holder.

4. A roll for use with a rotary crop treating device adapted to crush the crop, comprising a shaft having a cable holder loosely mounted on each end thereof, flexible cable extending between said cable holders in a plurality of strands securing said cable holders and shaft in assembly, means attached to the axially outer sides of said cable holders for rotatably mounting said roll in said crop treating device, one of said cable holders including a circular plate having openings around the periphery thereof and also having a concentric circular plate mounted on one side thereof over which said shaft is positioned, said one cable holder also including an annular disk adapted to be sleeved over said shaft, said disk having circumferentially spaced openings therethrough for the insertion of said flexible cable, and openings in said annular disk opposite the openings in the first mentioned circular plate through which bolts may be passed to draw said annular disk towards said first mentioned circular disk to tighten said flexible cable.

5. A roll for use with a rotary crop treating device adapted to crush the crop, comprising a shaft, a cable holder at each end of said shaft and extending radially outwardly therefrom, a cable supporting member rotatably mounted on said shaft between said cable holders, said cable supporting member extending radially outwardly from said shaft, and flexible cable strands radially outwardly of said shaft extending axially from one holder to the other in circumferentially spaced relation about the axis of said shaft and connected to said supporting member, said supporting member maintaining a predetermined spacing between the portions of said cable strands connected thereto.

6. The roll defined in claim 5 wherein said cable holders are rotatable relative to said shaft.

7. The roll defined in claim 5 wherein said cable holders are removably mounted on the ends of said shaft, said cable strands being held under tension between said cable holders and serving to hold said shaft and cable holders in assembly.

8. The roll defined in claim 5 wherein a plurality of like cable supporting members are rotatably mounted on said shaft in axially spaced relation between said cable holders connected to and supporting said cable strands to maintain a predetermined spacing therebetween at the point of connection.

9. The roll defined in claim 8 wherein tubular spacers are provided on said shaft between said cable supporting members and cable holders to space said supporting members from each other and from said cable holders.

10. The roll defined in claim 9 wherein said cable holders are removably mounted on the ends of said shaft, said cable strands being held under tension between said cable holders and serving to hold said shaft, cable holders, spacers and supporting members in assembly.

11. The roll defined in claim 10, wherein said cable holders are rotatable relative to said shaft and have supporting spindles coaxial with said shaft.

12. The roll defined in claim 5 wherein one of said cable holders includes a first member movable axially relative to said shaft to which said strands are attached, a second member in axially fixed position on said shaft, and means for connecting said first and second members together in axially adjusted position relative to each other to place a predetermined tension on said strands.

References Cited in the file of this patent

UNITED STATES PATENTS

| | | |
|---|---|---|
| 448,230 | Guichard | Mar. 17, 1891 |
| 2,711,622 | Cunningham | June 28, 1955 |
| 2,848,808 | Zifferer | Aug. 26, 1958 |
| 2,860,475 | Richard | Nov. 18, 1958 |